(12) United States Patent
Densel et al.

(10) Patent No.: US 6,592,151 B2
(45) Date of Patent: Jul. 15, 2003

(54) COUPLING ASSEMBLY

(75) Inventors: David S. Densel, Whitehouse, OH (US); Stephen D. Hargett, Delta, OH (US); Philip C. VanRiper, Holland, OH (US); Todd J. Vogel, Waterville, OH (US)

(73) Assignee: Eaton Aeroquip, Inc., Maumee, OH (US)

( * ) Notice: Subject to any disclaimer, the term of this patent is extended or adjusted under 35 U.S.C. 154(b) by 0 days.

(21) Appl. No.: 09/964,319

(22) Filed: Sep. 26, 2001

(65) Prior Publication Data

US 2002/0109351 A1 Aug. 15, 2002

Related U.S. Application Data

(63) Continuation-in-part of application No. 09/784,258, filed on Feb. 15, 2001, now Pat. No. 6,494,494.

(51) Int. Cl.$^7$ ................................................. F16L 55/00
(52) U.S. Cl. ..................... 285/39; 285/305; 285/321; 285/322; 285/323
(58) Field of Search .................... 285/39, 305, 321, 285/322, 323

(56) References Cited

U.S. PATENT DOCUMENTS

| | | | | |
|---|---|---|---|---|
| 3,272,538 A | * | 9/1966 | Bergstrom | 285/231 |
| 4,021,062 A | * | 5/1977 | Mariaulle | 285/39 |
| 4,440,424 A | * | 4/1984 | Mode | 285/396 |
| 4,593,943 A | * | 6/1986 | Hama et al. | 285/308 |
| 5,226,682 A | | 7/1993 | Marrison et al. | |
| 5,551,735 A | * | 9/1996 | Takayanagi et al. | 285/323 |
| 5,553,895 A | | 9/1996 | Karl et al. | |
| 6,183,020 B1 | | 2/2001 | Luft | |

FOREIGN PATENT DOCUMENTS

GB 11533785 * 11/1978 ................. 285/39

* cited by examiner

Primary Examiner—Lynne H. Browne
Assistant Examiner—G M Collins
(74) Attorney, Agent, or Firm—Rader, Fishman & Grauer PLLC

(57) ABSTRACT

A coupling assembly for connecting two members is provided that includes a first "male" member and a second "female" member. The first member includes a release sleeve moveably mounted thereon having a rigid release portion and a flexible sealing portion. The second member comprises at least one of an integral coupling member integrated into an apparatus, such as a pump, and an independent coupling member. Upon connection of the first and second members, the flexible sealing portion sealingly engages a mating surface on the second member to substantially inhibit the entry of contamination into an area between the first and second members when connected. The present invention provides an improved release sleeve that releases the male member from both an independent female member and an integral female member.

28 Claims, 9 Drawing Sheets

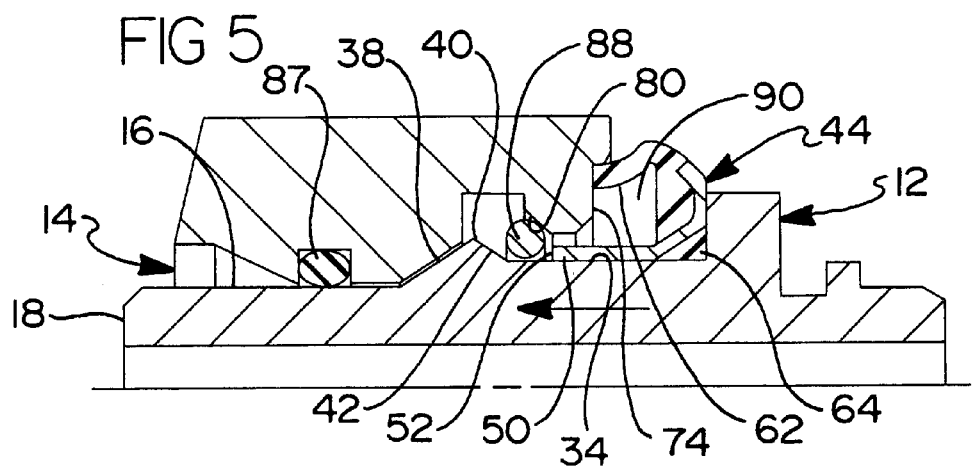
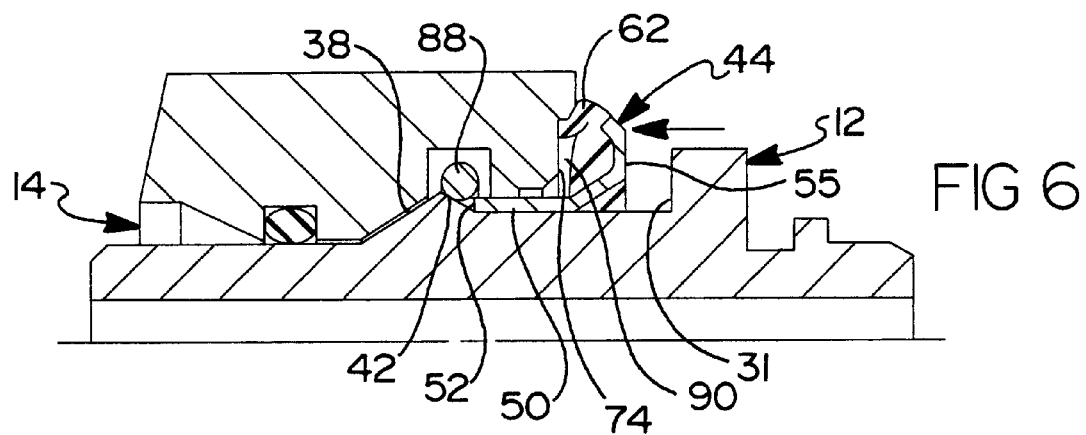
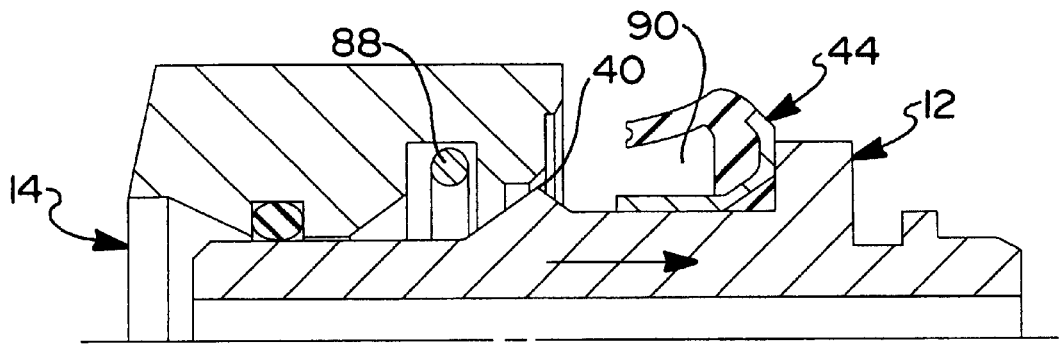

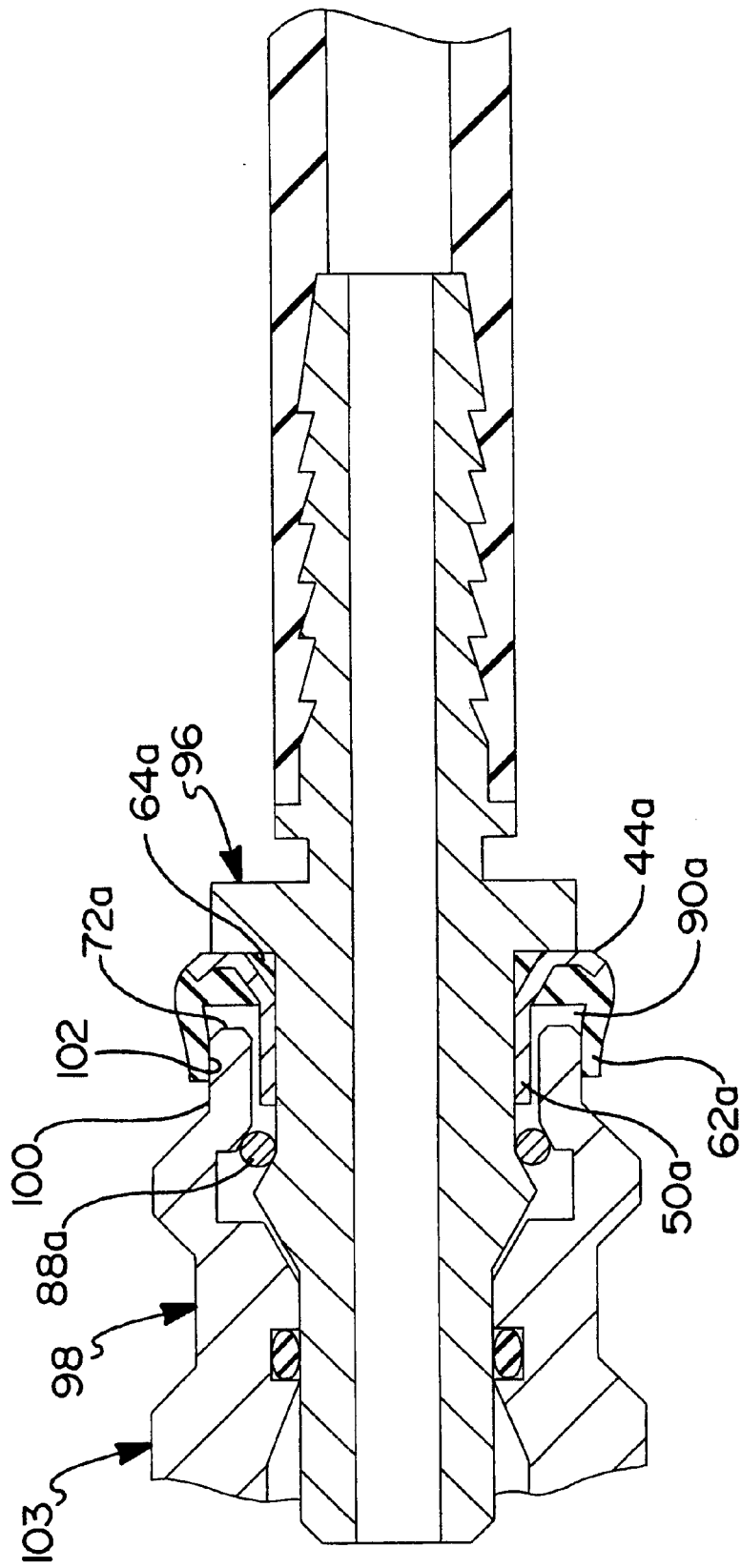

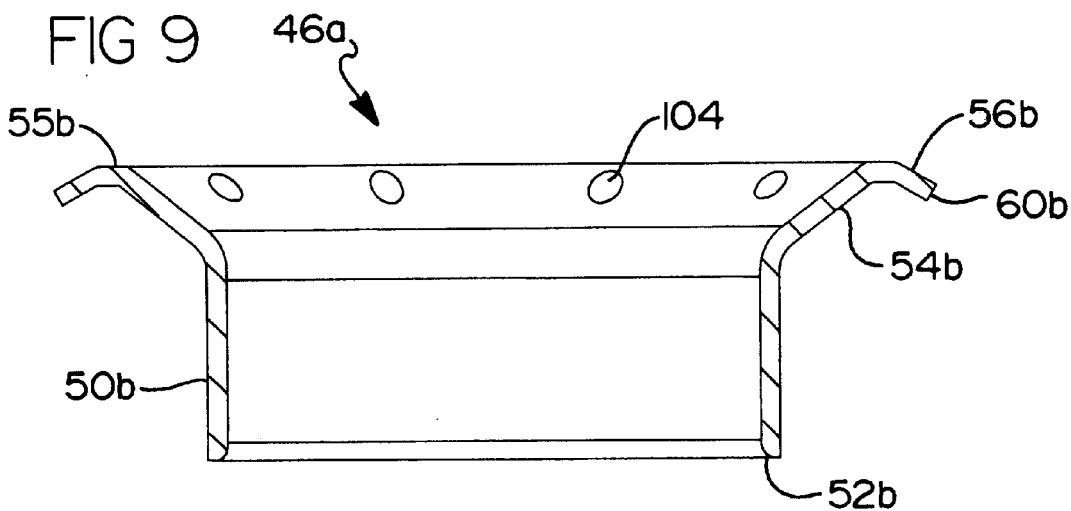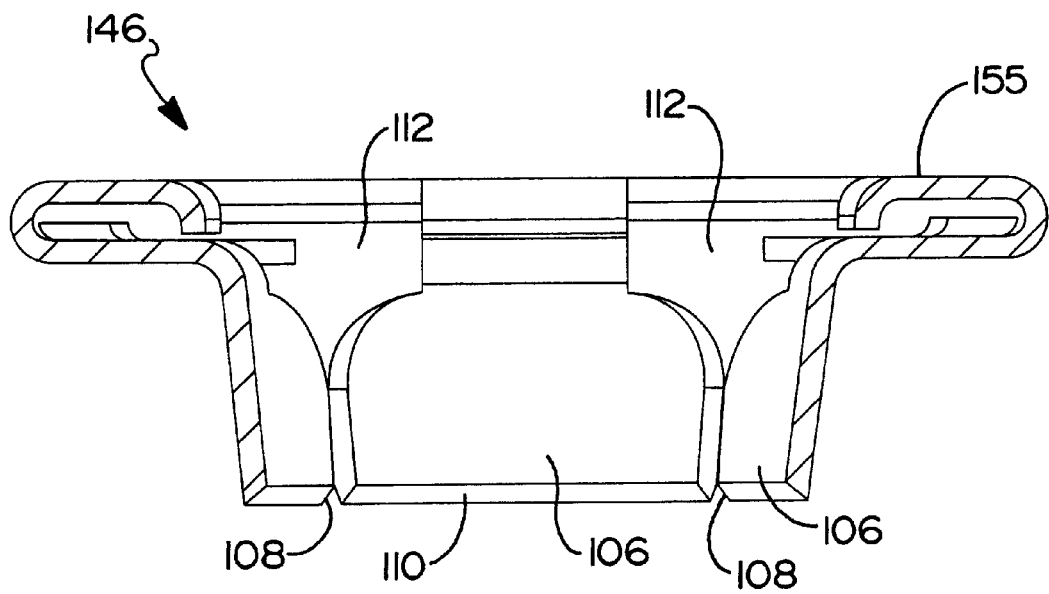

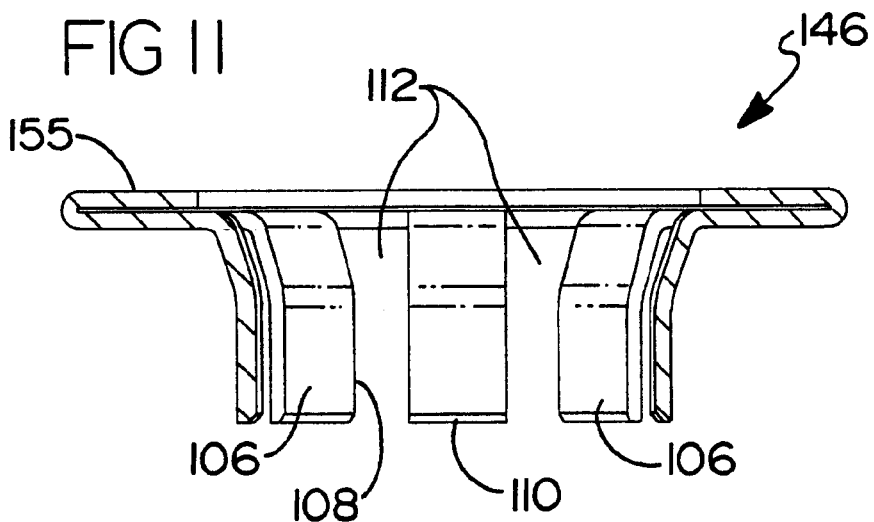
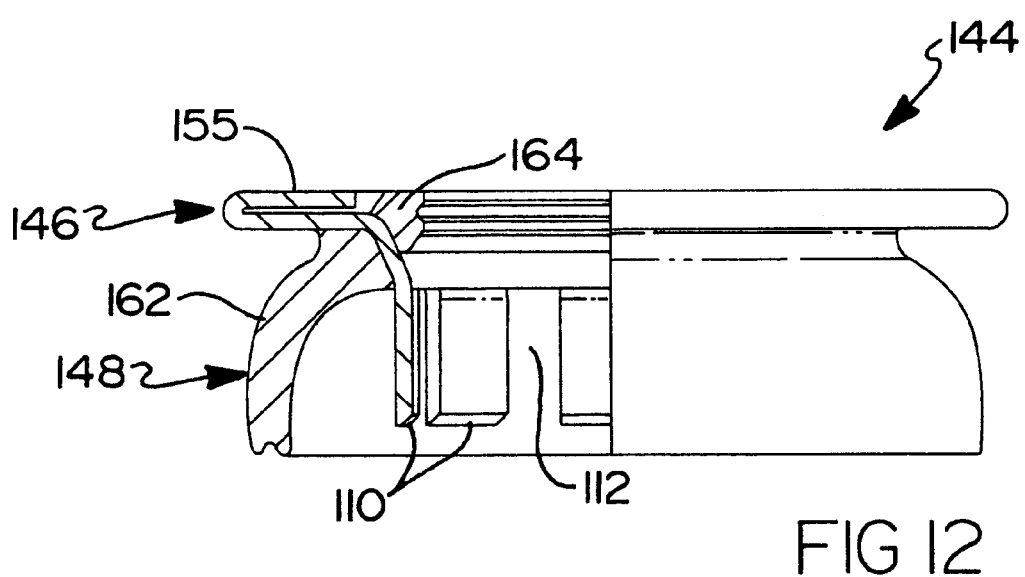

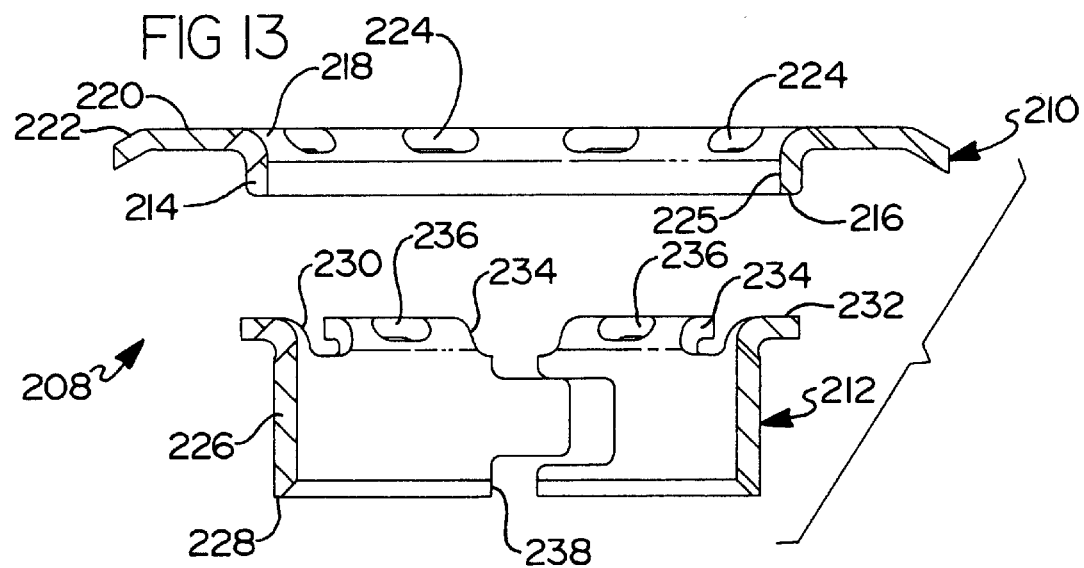
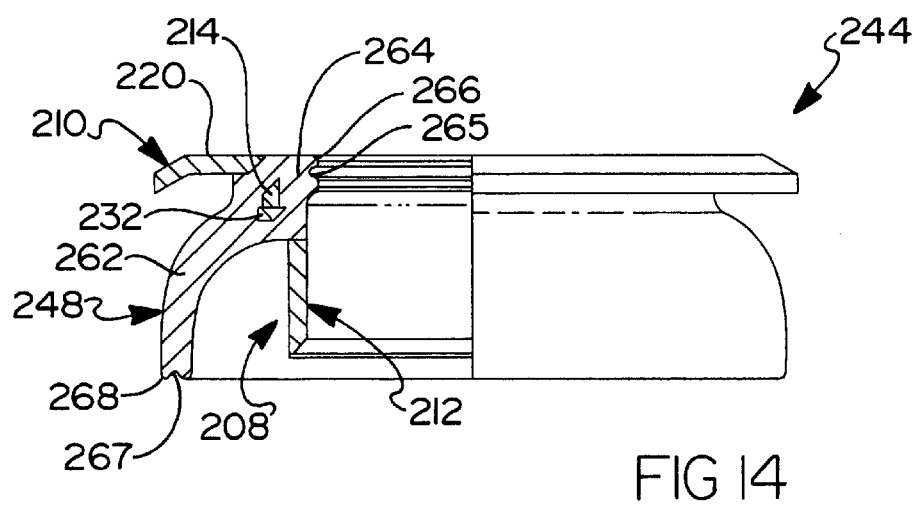

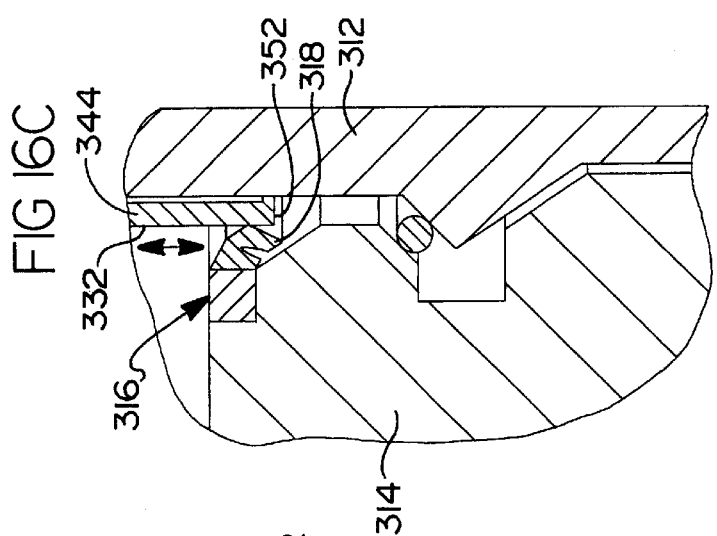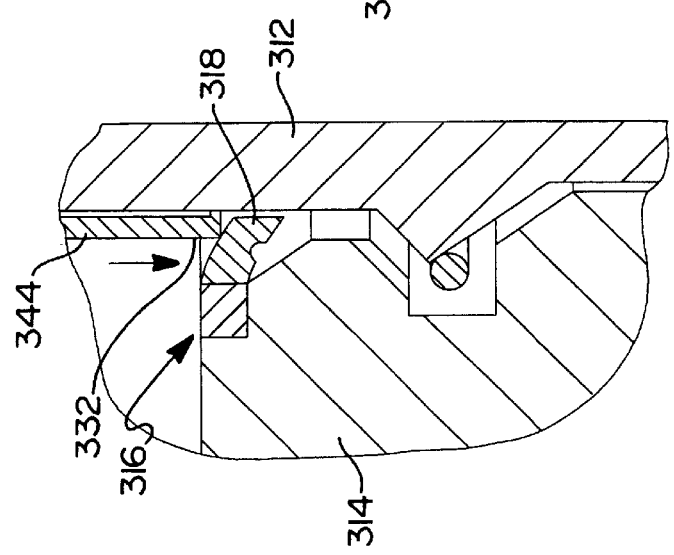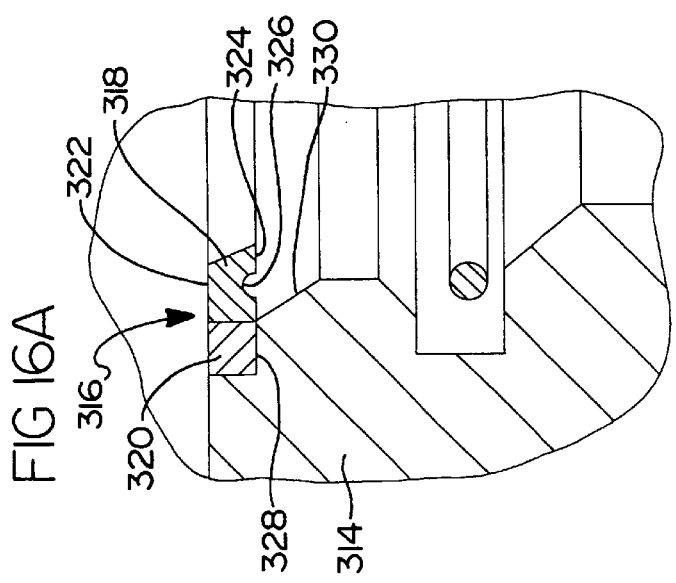

COUPLING ASSEMBLY

RELATED APPLICATIONS

The present application is a continuation-in-part of U.S. patent application Ser. No. 09/784,258, filed Feb. 15, 2001, now U.S. Pat. No. 6,494,494 the disclosure of which is incorporated by reference herein in its entirety.

FIELD OF THE INVENTION

The present invention relates generally to a coupling assembly for connecting two members together and more particularly to a releasable coupling assembly having an integral female member and a movable release sleeve.

BACKGROUND OF THE INVENTION

Coupling assemblies for the transmission of gases or fluids that may be secured together by axial movement of a male member into a female member are known in the art. There are continual efforts to improve upon the current designs of coupling assemblies, particularly to reduce the complexity and cost of the mating members. In a typical application, a male coupling member and female coupling member function as an adapter between a flexible conduit, such as a hose, and an apparatus, such as a pump. While several methods are commonly used to connect the male coupling member to the flexible conduit, such as a barbed hose adapter, the female coupling member is typically connected into a port in the apparatus using a threaded connection. A threaded connection requires the manufacturer to machine a threaded port into their apparatus and to purchase a separate female coupling member designed to engage the threaded port. Manufacturers have attempted to reduce complexity and cost by integrating the female coupling member directly into their apparatus thereby eliminating the need to purchase a separate "independent" female coupling member.

One type of known coupling assembly utilizes an annular locking ring to secure the male coupling member in the female coupling member upon insertion of the male coupling member. The annular locking ring typically engages an outwardly extending rib that may include a tapered ramp and a tapered shoulder. The male coupling member may include a release sleeve moveably mounted thereon for releasing the male member from the female member. A conventional release sleeve typically includes a rigid edge, which upon movement of the release sleeve toward the annular locking ring, forces the locking ring radially outwardly thereby allowing the male coupling member to be disconnected from the female member. Additionally, a conventional release sleeve typically includes a sealing portion that engages an external surface of the female coupling member upon connection with the male coupling member to substantially inhibit the ingression of dust or other contaminates into the area surrounding the annular locking ring. Contamination in the area surrounding the locking ring has been found to significantly reduce the operational life of the coupling assembly.

A key limitation of conventional release sleeves is that they function with either an "integral" female member or an "independent" female member, but not both. In one known release sleeve design, the sealing portion has an axial length sufficient to sealingly engage an exterior cylindrical surface of an "independent" female and to permit sufficient axial movement of the release sleeve toward the female member to engage the locking member. However, this release sleeve is incapable of connecting to an "integral" female member due to the inability of the sealing portion to deform as the male member and release sleeve are moved toward the female member. Therefore, in order to use the foregoing release sleeve design with an "integral" female coupling member, an annular groove is needed in the face of the female member to receive the sealing portion of the release sleeve. A groove of this nature is at best difficult to manufacture, thereby adding cost and complexity to the apparatus.

The inability of the foregoing release sleeve to function with an "integral" female member was addressed in another known release sleeve design. In this design, the axial length of the sealing portion is reduced and the diameter enlarged to permit movement toward an "integral" female member a distance sufficient to connect the coupling members and to cause the rigid edge to expand the locking ring. However, this release sleeve design is incapable of functioning with an "independent" female member due to the insufficient axial length of the sealing portion. In other words, the sealing portion in this design will not sealingly engage the exterior cylindrical sealing surface of an "independent" female member. Accordingly, there exists a need for a release sleeve having a sealing portion that sealingly engages both "independent" and "integral" female coupling members and permits axial movement of the release sleeve a distance sufficient to cause expansion of a locking ring.

In order to reduce complexity and cost, the present invention provides an "integral" female coupling member that may be formed directly into the body of an apparatus, such as a pump. The present invention further provides a release sleeve for releasing a male coupling member from both "independent" female coupling members and "integral" female coupling members.

SUMMARY OF THE INVENTION

The present invention recognizes the aforementioned limitations associated with convention coupling assemblies and provides a coupling assembly that includes a release sleeve that is capable of releasing a male coupling member from both "independent" female members and "integral" female members.

In accordance with an embodiment of the present invention, a coupling assembly is provided that includes a first "male" member and a second "female" member. The first member includes a protrusion having a first and second exterior surface separated by a radially outwardly extending retaining formation. The retaining formation includes an outwardly tapered inclined ramp and an inwardly tapered shoulder meeting at an apex. The first member further includes a release sleeve moveably mounted on the second external surface having a rigid release portion and a flexible sealing portion.

The second member comprises one of an "integral" coupling member integrated into an apparatus, such as a pump or manifold, and an "independent" coupling member. The second member includes a receiving portion therethrough having an inwardly facing annular groove in which is positioned a radially expandable locking member. The second member further includes a mating surface sealingly engaged by the flexible sealing portion of the release sleeve to substantially inhibit the ingression of contaminates into the area surrounding the locking member while the first and second members are connected.

Upon insertion of the first member into the receiving portion of the second member, the locking member is forced to expand over the outwardly tapered inclined surface of the receiving portion on the first member. Once over the apex, the locking member contracts to engage the tapered shoulder of the rib to positively retain the first member in the second member. The release sleeve further includes a rigid release portion that, upon movement of the release sleeve toward the locking member, forces the locking member to expand over the apex to permit the first member to be disconnected from the second member.

In another embodiment of the present invention a coupling assembly is provided that includes a first "male" coupling member and a second "female" coupling member. The second coupling member includes a portion for receiving the first coupling member and an annular sealing member proximate a receiving end of the second coupling member. The sealing member comprises a rigid retaining member and a flexible sealing portion. When the first coupling member is connected to the second coupling member, the flexible sealing portion sealingly engages the first coupling member to inhibit the ingression of contaminates into an area between the first and second coupling members.

Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 5 is a partial side elevational view of an embodiment of the present invention illustrating the coupling members in the connected configuration.

FIG. 6 is a partial side elevational view illustrating the relative position of the parts upon movement of the release sleeve to a position causing the locking ring to be moved to the release position.

FIG. 7 is a partial side elevational view illustrating the relative position of the parts upon disengagement of the first member from the second member.

FIG. 8 is a cross-sectional view of a coupling assembly according to a second embodiment of the present invention illustrating the coupling members in the connected position.

FIG. 9 is a cross-sectional view of a rigid release portion according to a third embodiment of the present invention.

FIG. 10 is a cross-sectional view of a rigid release portion according to a fourth embodiment of the present invention illustrating relatively wide release members.

FIG. 11 is a cross-sectional view of a rigid release portion according to the fourth embodiment of the present invention illustrating relatively narrow release members.

FIG. 12 is a sectional view of a release sleeve including the rigid release portion of FIG. 11.

FIG. 13 is a cross-sectional view of a rigid release portion according to a fifth embodiment of the present invention.

FIG. 14 is a sectional view of a release sleeve including the rigid release portion of FIG. 13.

FIGS. 16A, 16B and 16C are cross sectional views of the coupling assembly of FIG. 15 illustrating the coupling assemby before connection, during connection and after connection, respectively.

DETAILED DESCRIPTION OF PREFERRED EMBODIMENTS

Figure 1:
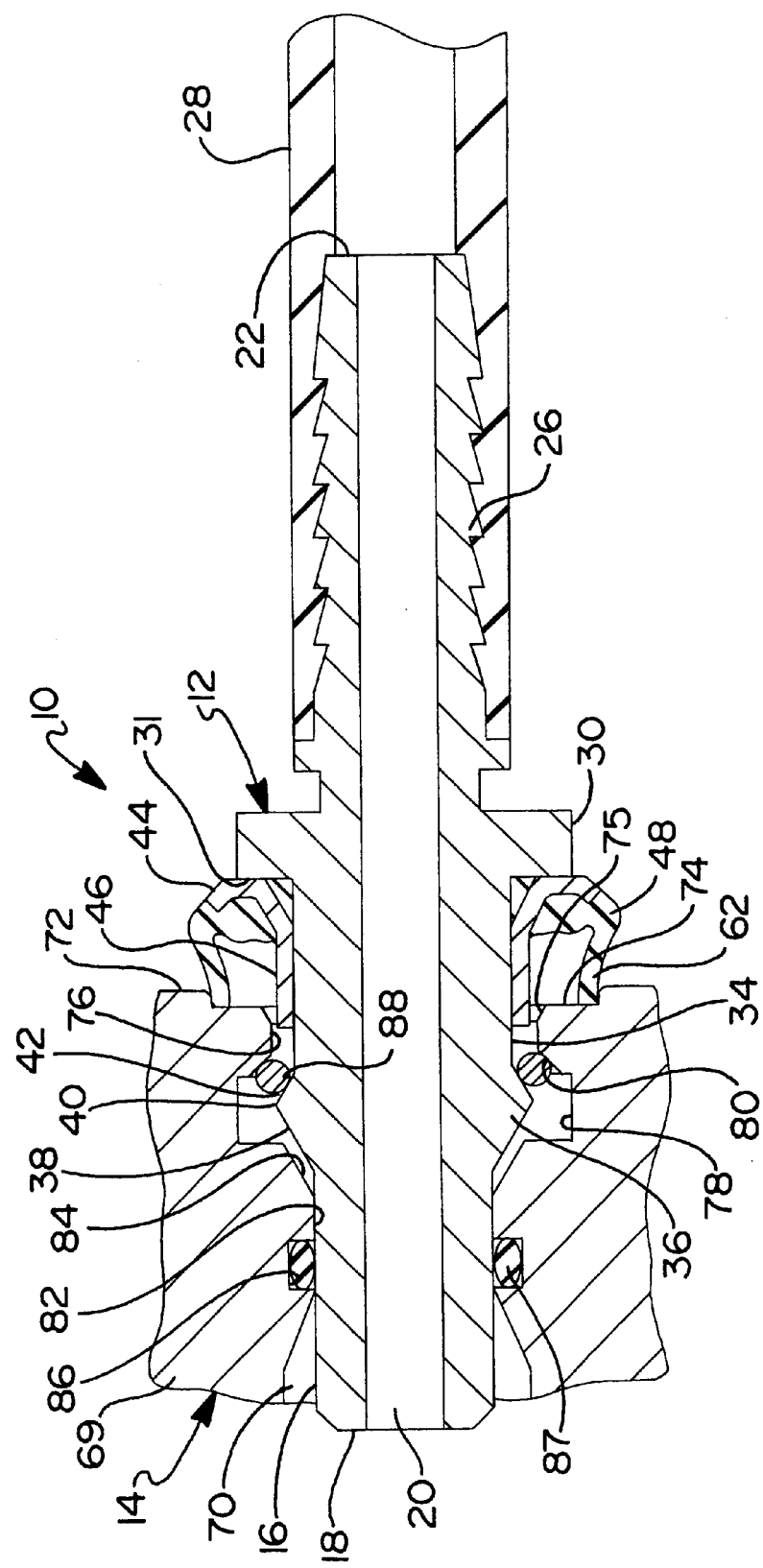
FIG. 1 is a cross-sectional view of an embodiment of the present invention illustrating the coupling members in the connected position.

Referring now to the drawings, the preferred embodiments of the present invention are described in detail. Referring to FIG. 1, a preferred embodiment of a coupling assembly 10 is shown that includes a first member 12 and a second member 14 shown in the connected configuration. Members 12 and 14 preferably have a generally tubular shape. First member 12, which functions as the "male" member of coupling assembly 10, includes a protrusion having a first exterior surface 16 adjacent an engagement end 18 for insertion into second member 14. First member 12 further includes a duct 20 extending therethrough from an engagement end 18 to an attachment end 22. If desired, attachment end 22 of first member 12 may be provided with a barbed hose adapter 26 or other suitable connection means for fastening to a separate member 28, such as a flexible conduit or hose. First member 12 preferably includes a smooth cylindrical surface 30 extending radially outwardly from first member 12. Alternatively, at least two flats for engagement by a wrench may be formed into cylindrical surface 30 if attachment end 22 is provided with external threads as the connection means. A support surface 31 is positioned substantially perpendicular to cylindrical surface 30. Adjacent to support surface 31, is located a second exterior surface 34 which is separated from first exterior surface 16 by a retaining formation 36. The retaining formation 36 preferably includes a ramp 38 tapering outwardly from first exterior surface 16 in a direction away from engagement end 18. Ramp 38 extends to an apex 40 where it meets a shoulder 42 that tapers inwardly to second exterior surface 34. Alternatively, ramp 38 may extend to a cylindrical surface that is substantially parallel to second exterior surface 34 and extends away from ramp 38 until it meets shoulder 42, as illustrated in U.S. Pat. No. 5,553,895 owned by the assignee of the present invention, the disclosure of which is incorporated by reference herein in its entirety.

Figure 3:
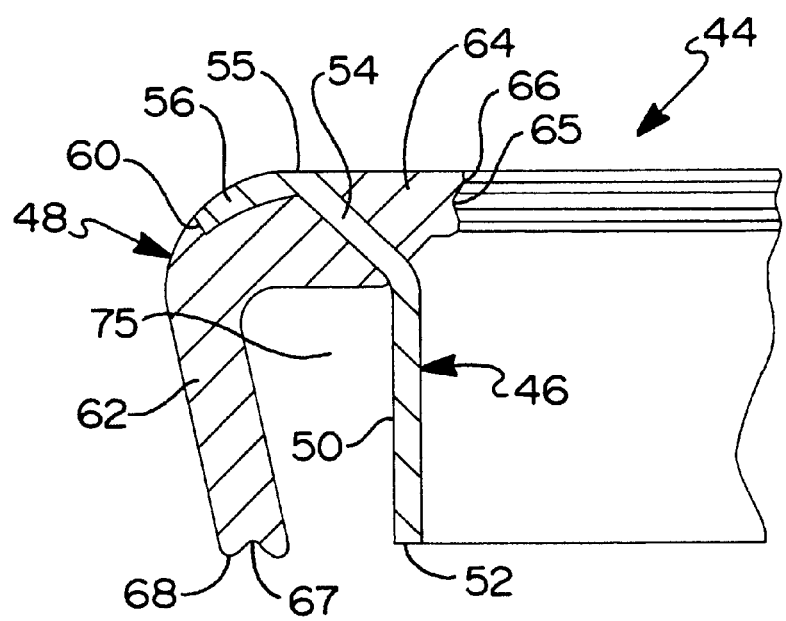
FIG. 3 is a sectional view of the release sleeve along the plane indicated by 3—3 in FIG. 2.
Figure 4:
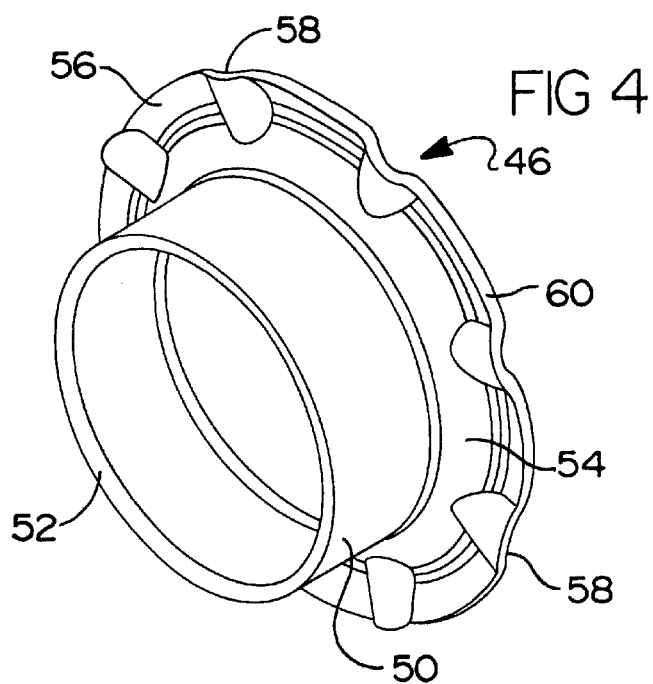
FIG. 4 is a perspective view of a rigid release portion of the release sleeve of FIG. 2.

A release sleeve 44 may be moveably mounted on the second exterior surface 34 of first member. Release sleeve 44 includes an annular rigid release portion 46 and a flexible sealing portion 48. As shown in FIGS. 3 and 4, rigid release portion 46 includes a generally cylindrical wall portion 50 that extends from a leading edge 52 to an outwardly radially extending, preferably tapered, wall portion 54. In a preferred embodiment, the wall portion 54 terminates into a flat 55 having a generally downwardly sloping flange portion 56. When it is desired to move release sleeve 44 on first member 12, a tool (not illustrated) may be used for additional leverage between flat 55 and support surface 31. Flange portion 56 provides a guide to direct the insertion of the tool in between flat 55 and support surface 31. As better illustrated in FIGS. 3 and 4, flange portion 56 may include a plurality of impressions 58 beginning at a radially outer terminal edge 60 of flange portion 56, such impressions extending radially inwardly through flat 55 into tapered wall portion 54. Release sleeve 44 is preferably secured to first member 12 by annularly reducing or "crimping" wall portion 50 around second exterior surface 34. Alternatively, rigid release portion 46 may be non-continuous having a split from leading edge 52 through edge 60 of flange portion 56, thereby allowing rigid release portion 46 to expand over retaining formation 36 during assembly onto first member 12.

Figure 2:
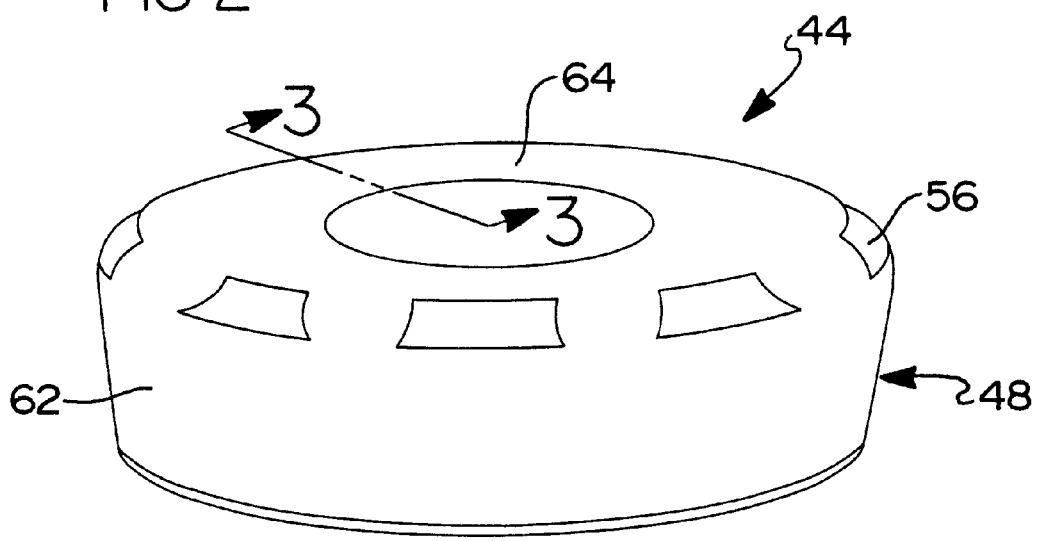
FIG. 2 is a perspective view of a release sleeve.

Referring to FIGS. 2 and 3, sealing portion 48 preferably comprises a polymeric material having an elastomeric and/or thermoplastic base polymer, such as Hydrogenated Nitrile-Butadiene Rubber (HNBR). However, the present invention is not limited to such polymeric material and other materials providing similar structure and functionality may also be used.

Sealing portion 48 includes a generally bulbous or bell-shaped, preferably radially inwardly sloping, wall portion 62, and an annular fin portion 64 located radially inwardly of tapered wall portion 54. Fin portion 64 sealingly engages second exterior surface 34 and/or support surface 31 of first member 12 to substantially inhibit the entry of contamination, such as dirt and other debris, into the coupling assembly while first member 12 and second member 14 are connected. As illustrated in FIG. 3, an inside diameter 65 of fin portion 64 may include at lease one sealing bead 66. Similarly, a distal end 67 of inwardly sloping wall portion 62 may include at least one distal sealing bead 68, however a plurality of distal sealing beads is preferred. Sealing bead 66 reduces the drag of fin portion 64 against first member 12 as release sleeve 44 moves on first member 12. Distal sealing bead 68 reduces the axial force needed to sealingly engage second member 14 when first member 12 is connected to second member 14.

Sealing portion 48 is generally molded around tapered wall portion 54, flat 55 and flange portion 56. A chemical compound, such as an adhesive, may be incorporated into the polymeric material or applied directly to rigid release portion 46 before the molding operation to chemically attach sealing portion 48 to rigid release portion 46. The geometry of tapered wall portion 54 is designed to allow space for fin portion 64. However, it is recognized that other contours of tapered wall portion 54 that provide suitable space for fin portion 64 may be used. During the process of molding sealing portion 48 around tapered wall portion 54, flat 55 and flange portion 56, polymeric material will flow into impressions 58, as shown in FIG. 2. Impressions 58 facilitate material flow between opposite sides of tapered wall portion 54 to allow sealing portion 48 to remain one continuous member. In addition, impressions 58 permit sealing portion 48 to be attached to rigid release portion 46 without encapsulating flat 55 within sealing portion 48. A greater mechanical advantage may be realized when a tool is used as leverage between the rigid flat 55 and support surface 31 if flat 55 is not covered by sealing portion 48. However, it is recognized that sealing portion 48 may encapsulate flat 55 when an increase in mechanical advantage is not required.

Referring again to FIG. 1, second member 14 generally functions as the "female" member of coupling assembly 10 and is designed to receive a portion of the first member 12. In a preferred embodiment, second member 14 is formed into an apparatus, such as a pump or manifold. Second member 14 may be formed, for example, by machining, molding or casting the profile of second member 14 directly into a body 69 of an apparatus. Second member 14 includes a receiving portion 70, such as a duct, therethrough that extends from a receiving end 72. Receiving end 72 preferably includes a recess 74 that cooperates with bulbous wall portion 62 of release sleeve 44 in both an axial and radial direction to substantially inhibit the entry of contamination into receiving portion 70. Recess 74 provides a finished surface having a quality suitable for sealingly engaging bulbous wall portion 62. However, a recess is not necessarily needed if the surface quality of receiving end 72 is suitable for sealingly engaging bulbous wall portion 62 and, in addition, the benefit of a radial seal is not required.

A first chamfer 75 extends inwardly from recess 74 to a first interior cylindrical surface 76. Cylindrical surface 76 includes a first inwardly facing annular groove 78 extending radially outwardly therefrom. A second chamfer 80 extends inwardly from first annular groove 78 toward receiving end 72 until it meets first interior cylindrical surface 76. Second member 14 preferably includes a second interior cylindrical surface 82 that is joined to first annular groove 78 by a tapered wall portion 84. The inside diameter of second interior cylindrical surface 82 is slightly larger than the outside diameter of first exterior surface 16 on first member 12 to allow first member 12 to be received within receiving portion 70. The second interior cylindrical surface 82 preferably has formed therein a second inwardly facing annular groove 86 in which is positioned an annular sealing element 87, such as an o-ring.

Received in first annular groove 78 is an annular locking member 88 preferably formed of a metal, and more preferably stainless steel. In a preferred embodiment the metal of locking member 88 is spring tempered so that locking member 88 has flexibility to expand and return to its original shape. Preferably, locking member 88 is not continuous, but includes a space between two ends (not illustrated) thereby allowing locking member 88 to expand and contract without altering its annular shape. While first member 12 is disconnected from second member 14, locking member 88 has an external diameter less than the inside diameter of first annular groove 78 but larger than the diameter of first internal cylindrical surface 76. Additionally, locking member 88 has an internal diameter substantially equal to or, preferably slightly smaller than that of second exterior surface 34 on first member 12 allowing locking member 88 to tightly engage first member 12 when connected to second member 14.

Referring to FIG. 5, as first member 12 is inserted into second member 14, engagement end 18 and first exterior surface 16 pass through the inside diameter of locking member 88 until ramp 38 reaches locking member 88. Upon further insertion, locking member 88 is forced to travel up ramp 38 thereby expanding locking member 88 until it reaches apex 40. As apex 40 moves past locking member 88, the resilience of the metal contracts locking member 88 as it travels down shoulder 42, until it contacts second exterior surface 34. Upon complete insertion of first member 12 into second member 14, locking member 88 is positioned substantially between shoulder 42, chamfer 80 and second exterior surface 34. Movement of first member 12 in a direction away from second member 14 forces locking member 88 to engage both shoulder 42 and chamfer 80 thereby preventing the removal of first member 12 from second member 14.

Referring still to FIG. 5, upon complete insertion of first member 12 into second member 14, first exterior surface 16 sealingly engages annular sealing element 87 to prevent leakage of a fluid. Additionally, bulbous wall portion 62 and fin portion 64 of release sleeve 44 sealingly engage recess 74 and second exterior surface 34 respectively to substantially inhibit the ingression of dust or other contaminates into the area surrounding locking member 88. The preferably radially inwardly sloping geometry of bulbous wall portion 62 and the flexible material properties of sealing portion 48 allow bulbous wall portion 62 to deform as it engages recess 74. The ability of bulbous wall portion 62 to deform upon engagement with recess 74 provides the advantage of lowering the axial force needed to insert first member 12 into second member 14. In addition, the flexible properties and geometry of sealing portion 48 permit axial movement of release sleeve 44 on first member 12 during insertion into second member 14 without losing a seal. Axial movement of release sleeve 44 may be caused by vibration, impulse pressure loading, or by the operator during disconnection of first member 12 from second member 14, as described below.

Referring now to FIG. 6, when it is desired to disconnect first member 12 from second member 14, release sleeve 44 is moved in a direction towards second member 14. As described above, a tool may used for additional leverage between support surface 31 and release sleeve 44. In most instances the use of a tool to move release sleeve 44 is required due to the relatively large force needed to expand locking member 88 during connection. Cylindrical wall portion 50 of rigid release portion 46 and bulbous wall portion 62 of sealing portion 48 cooperate to define a gap 90 therebetween. Gap 90 cooperates with recess 74 in second member 14 to provide an area for deformation of bulbous wall portion 62. Upon movement of release sleeve 44 towards second member 14, bulbous wall portion 62 of flexible sealing member 48 collapses on itself, allowing the leading edge 52 of cylindrical wall portion 50 in release sleeve 44 to engage locking member 88. Cylindrical wall portion 50 forces locking member 88 axially towards tapered shoulder 42, whereby tapered shoulder 42 forces locking member 88 to expand or, alternatively, wall portion 50 slides under locking member 88 to force the expansion of locking ring 88. As seen in FIG. 7, when the inside diameter of locking member 88 is expanded to a diameter greater than the diameter of apex 40, first member 12 will be release from second member 14 and is free to be removed therefrom.

Referring to FIG. 8, a second embodiment of the present invention is shown in detail. In the second embodiment, a coupling assembly is provided that includes a male member 96, that includes a release sleeve 44a, and a female member 98. The male member 96 and release sleeve 44a are substantially similar to first member 12 and release sleeve 44 in the preferred embodiment. Female member 98 is substantially similar to second member 14 in the preferred embodiment with at least one exception, namely, the body of female member 98 is independent from the apparatus in which it is received. When male member 96 is engaged in female member 98, receiving end 72a and portions of female member 98 adjacent thereto are positioned in a gap 90a created between a cylindrical wall portion 50a and a bulbous wall portion 62a. An exterior cylindrical surface 100 of female member 98 is sealably engaged with the inside surface 102 of bulbous wall portion 62a of release sleeve 44a to substantially inhibit, along with a fin potion 64a, the ingression of dust or other contaminates into the area surrounding locking member 88a when the members are engaged. Female member 98 further includes an attachment end (not illustrated), such as a threaded connection, for securing female member 98 to an apparatus. At least two flats 103 for engagement by a wrench may be provided to secure female member 98 to an apparatus, such as a pump or manifold.

Referring to FIG. 9, a third embodiment of the present invention is shown in detail. In the third embodiment, a rigid release portion 46a is provided for use in release sleeve 44 that includes a cylindrical wall portion 50b extending from a leading edge 52b to an outwardly radially extending, preferably tapered, wall portion 54b. Wall portion 54b terminates into a flat 55b having a generally downwardly sloping flange portion 56b. Wall portion 54b includes a plurality of apertures 104 therethrough. During the process of molding sealing potion 48 around wall portion 54b and flange portion 56b, polymeric material will flow through apertures 104 uniting bulbous wall portion 62 and fin portion 64 of sealing portion 48 as described above and shown in FIG. 3. The use of apertures 104 is advantageous because it allows sealing portion 48 to remain one continuous member. In addition, apertures 104 permit sealing portion 48 to be attached to the rigid release portion 46a without encapsulating flat 55b within sealing portion 48. As with the preferred release sleeve 44, a greater mechanical advantage may be realized when a tool is used as leverage between the rigid flat 55b and support surface 31 if flat 55b is not covered by flexible sealing portion 48. However, it is recognized that sealing portion 48 may encapsulate flat 55b when an increase in mechanical advantage is not required. The resulting alternate embodiment of release sleeve 44 is preferably secured to first member 12 by annularly reducing or "crimping" wall portion 50b around second exterior surface 34 of first member 12. Alternatively, the rigid release portion 46a may be split from a leading edge 52b through a terminal edge 60b in flange portion 56b allowing the rigid release portion 46a to expand during assembly onto first member 12.

Referring to FIGS. 10–12, a fourth embodiment of the present invention is shown in detail. In the fourth embodiment, a rigid release portion 146 is provided for use in release sleeve 44 that includes a flat surface 155 having a plurality of integrally formed, finger-like, release members 106 extending therefrom. Release members 106 have therebetween a plurality of slots 108 extending from a leading edge 110 into a plurality of apertures 112. By way of example only, rigid release potion 146 may include a plurality of relatively wide release members 106, as illustrated in FIG. 10, or as illustrated in FIG. 11, rigid release portion 146 may include a plurality of relatively narrow release members 106. Rigid release portion 146 is preferably manufactured of a resilient material, such as spring steel, allowing release members 106 to flex outwardly or expand over retaining formation 36 during assembly onto first coupling member 12.

Referring to FIG. 12, a sealing portion 148, that is substantially similar to sealing portion 48 described in the preferred embodiment, is secured to rigid release portion 146, for example, by a molding operation. During the process of molding sealing potion 148 around flat 155, polymeric material will flow through apertures 112 uniting a bulbous wall portion 162 and a fin portion 164 of sealing portion 148. The use of apertures 112 is advantageous because it allows sealing portion 148 to remain one continuous member. In addition, apertures 112 permit sealing portion 148 to be attached to the rigid release portion 146 without encapsulating flat 155 within sealing portion 148. As with the preferred release sleeve 44, a greater mechanical advantage may be realized when a tool is used as leverage between the rigid flat 155 and support surface 31 of first coupling member 12 if flat 155 is not covered by sealing portion 148. However, it is recognized that sealing portion 148 may encapsulate flat 155 when an increase in mechanical advantage is not required. Moreover, this embodiment is advantageous because it allows release members 106 to expand over retaining formation 36 on first coupling member 12 during attachment thereto.

Referring to FIGS. 13 and 14, a fifth embodiment of the present invention is shown in detail. In the fifth embodiment, a release sleeve 244 is provided for use with first coupling member 12. As illustrated in FIG. 14, release sleeve 244 comprises a rigid release portion 208 that includes a first release member 210 and a separately formed second release member 212. Release sleeve 244 further includes a flexible sealing portion 248 attached to and joining the first and second release members 210, 212.

Referring to FIG. 13, first release member 210 includes a generally cylindrical wall portion 214 that extends from a leading edge 216 to a radius 218. The radius 218 terminates into a flat 220 that preferably includes a generally downward sloping flange portion 222 to facilitate insertion of a tool between flat 220 and support surface 31 of first coupling member 12, as described above. Radius 218 preferably includes a plurality of apertures 224 therethrough to facilitate attachment of sealing portion 248, as will be discussed below. An inner diameter 225 of wall portion 214 is slightly larger than retaining formation 36 on first coupling member 12 allowing first release member 210 to easily slide onto first coupling member 12 during attachment thereto.

Referring still to FIG. 13, second release member 212 includes a generally cylindrical wall portion 226 that extends from a leading edge 228 to a radius 230. The radius 230 terminates into a flat 232 that provides an interface for engaging the leading edge 216 of first release member 210 to facilitate the transmission of axial force from first release member 210 to second release member 212 when first coupling member 12 is disconnected from second coupling member 14. Flat 232 is not continuous, but defines a plurality of spaced apart tabs 234 that are bent outwardly from wall portion 226 during manufacture. Radius 230 preferably includes a plurality of apertures 236 therethrough that facilitate attachment of sealing portion 248.

Second release member 212 is preferably non-continuous having a split 238 that extends from leading edge 228 through wall portion 226. Split 238 allows second release member 212 to expand over retaining formation 36 on first coupling member 12 during attachment thereto. Split 238 may be keyed, as illustrated in FIG. 13, to prevent flat 232 from becoming uneven due to torsion as second release member 212 is expanded over retaining formation 36.

Referring to FIG. 14, first and second release members 210, 212 are joined together by a sealing portion 248 that is substantially similar to sealing portion 48 described in the preferred embodiment. During the process of molding sealing potion 248, polymeric material will flow through apertures 224 and 236 in first release member 210 and second release member 212, respectively, thereby uniting a bulbous wall portion 262 and a fin portion 264 of sealing portion 248, as illustrated in FIG. 14. The use of apertures 224 and 236 is advantageous because it allows sealing portion 248 to remain one continuous member. In addition, apertures 224 and 236 permit sealing portion 248 to be attached to the rigid release portion 208 without encapsulating flat 220 within sealing portion 248. As described above, a greater mechanical advantage may be realized when a tool is used as leverage between flat 220 and support surface 31 of first coupling member 12 if flat 220 is not covered by sealing portion 248. However, it is recognized that sealing portion 248 may encapsulate flat 220 when an increase in mechanical advantage is not required.

Figure 15:
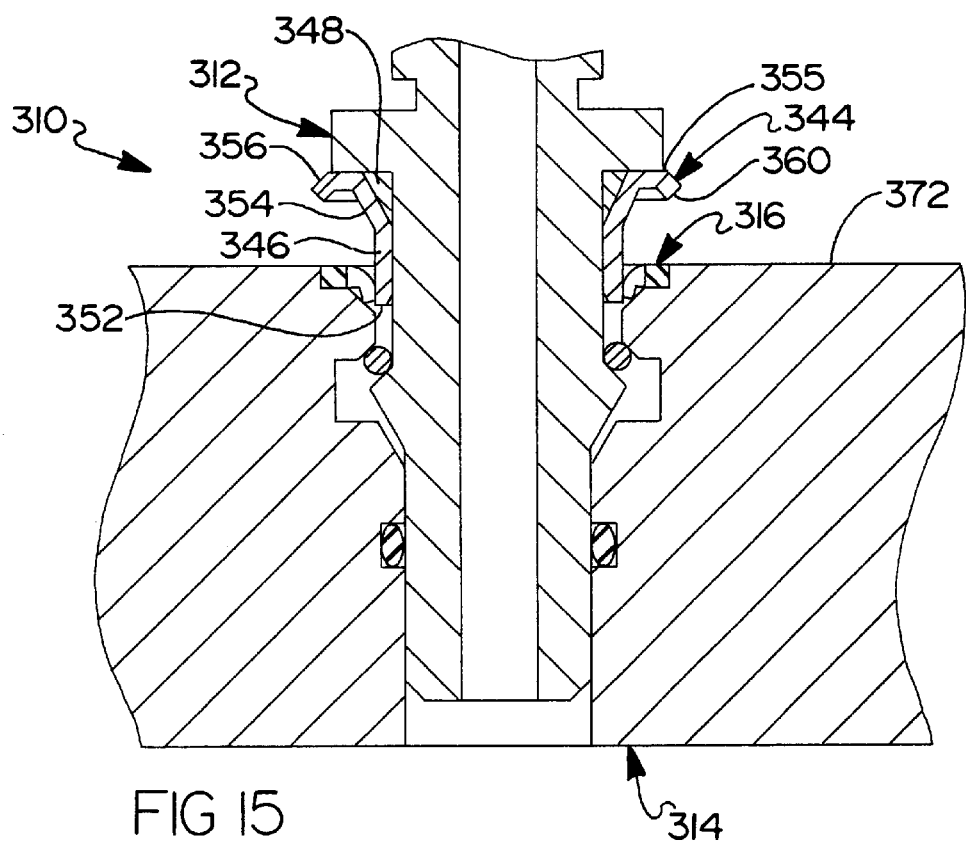
FIG. 15 is a cross-sectional view of a coupling assembly according to a sixth embodiment of the present invention illustrating the coupling members in the connected position.

Referring to FIGS. 15–16C, a sixth embodiment of the present invention is shown in detail. In the sixth embodiment, a coupling assembly is provided that includes a male coupling member 312 having a release sleeve 344 movably mounted thereon and an female coupling member 314, depicted in FIG. 15 as being an "integral" female coupling member, but not intended to be limited thereto. Accordingly, female coupling member 314 may function satisfactorily as an "independent" female coupling member.

Referring to FIG. 15, male coupling member 312 and release sleeve 344 are substantially similar to first coupling member 12 and release sleeve 44 described in the preferred embodiment (FIG. 1) with at least one exception, namely, a sealing portion 348 of release sleeve 344 does not include a bulbous portion to sealingly engage female coupling member 314. While release sleeve 344 will be described herein as not requiring a bulbous portion, the female coupling member 314 according to the sixth embodiment would satisfactorily mate with a male coupling member 12 having a release sleeve 44 according to the preferred embodiment. Similarly, other release sleeve designs, such as those described in the third, forth and fifth embodiments of the present invention, may also function satisfactorily with female coupling member 314.

Referring still to FIG. 15, female coupling member 314 is substantially similar to second coupling member 14 in the preferred embodiment with at least one exception, namely, an annular sealing member 316 is provided proximate a receiving end 372 of female coupling member 314. As illustrated in FIG. 16A, annular sealing member 316 generally comprises a flexible sealing portion 318 attached to rigid retaining portion 320.

Sealing portion 318 preferably comprises a polymeric material that is substantially similar to the material of sealing portion 48 described in the preferred embodiment. A chemical compound, such as an adhesive, may be incorporated into the polymeric material or applied directly to retaining portion 320 before attaching sealing portion 318 to retaining portion 320. Structurally, sealing portion 318 includes an external surface 322 and an internal surface 324 having a notch 326 or similar feature that allows sealing portion 318 to collapse on itself in the presence of an axially directed force applied to external surface 322, as illustrated in FIGS. 16B and 16C.

Retaining portion 320 is generally annular in configuration and is received in a groove 328 provided in female coupling member 314 proximate receiving end 372. Groove 328 is preferably slightly smaller in diameter than an outside diameter of retaining portion 320 requiring that retaining portion 320 be pressed into groove 328. As retaining portion 320 is pressed into groove 328, an interference is created that causes retaining portion 320 to be secured in groove 328. A chamfer relief area 330 is preferably provided adjacent sealing member 316 to provide sufficient room for sealing portion 318 to deform during connection of male coupling member 312.

Referring to FIGS. 16B and 16C, as male coupling member 312 is inserted into female coupling member 314, release sleeve 344 engages external surface 322 of sealing portion 318 causing sealing portion 318 to deform as needed to accommodate release sleeve 344. The deformation of sealing portion 318 minimizes the axial force needed to insert male coupling member 312 into female coupling member 314 without sacrificing the seal between the sealing portion 318 and release sleeve 344.

Upon connection of the male and female coupling members 312 and 314, sealing member 316 sealably engages an external surface 332 of release sleeve 344. The seal prevents contamination, such as, for example, dirt and other debris, from entering the connection area between the male and female coupling members 312, 314. The flexibility of sealing portion 318 permits it to move axially with movement of male coupling member 314, which may be caused by, for example, vibration or impulse pressure loading, to prevent contamination from being drawn past the interface of sealing portion 318 and release sleeve 344.

Among other advantages, the present invention provides a coupling assembly that includes a male coupling member having a release sleeve that, unlike the prior art, can be used to sealingly engage both "independent" and "integral" female coupling members. When used in conjunction with an "integral" female coupling member, the release sleeve of the present invention sealingly engages a recess in the face of the female member to seal in both an axial and a radial direction. The release sleeve includes a flexible sealing portion capable of deformation to permit movement of the release sleeve a distance sufficient to cause the rigid release member to expand the locking ring. Moreover, the flexible material properties and bulbous geometry of the flexible sealing member reduce the axial force needed to connect the male coupling member in the "integral" female coupling member. When used in conjunction with an "independent" female member, an inside surface of the flexible sealing portion sealingly engages an exterior surface of the female member to seal in a radial direction.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A release sleeve suitable for movable mounting on a first coupling member to release the first coupling member from a second coupling member comprising one of an integral coupling member and an independent coupling member, the release sleeve comprising:
   a rigid release portion including a first release member and a separate second release member; and
   a flexible sealing portion attached to and joining the first and second release members, the flexible sealing portion including a bulbous portion capable of sealingly engaging an exterior mating surface on the integral coupling member and an exterior mating surface on the independent coupling member to substantially inhibit the entry of contamination into an area between the first and second coupling members when connected.

2. A release sleeve according to claim 1, wherein the first release member includes a cylindrical wall portion that extends from a leading edge to a flat having a generally downwardly sloping flange portion.

3. A release sleeve according to claim 2, wherein the first release member includes a plurality of apertures therethrough to facilitate attachment of the flexible sealing portion.

4. A release sleeve according to claim 1, wherein the second member comprises a cylindrical wall portion that extends from a leading edge to a flat that provides an interface for engaging the first release member.

5. A release sleeve according to claim 4, wherein the second release member includes a plurality of apertures therethrough to facilitate attachment of the flexible sealing portion.

6. A release sleeve according to claim 1, wherein after attachment of the flexible sealing portion to the rigid release portion, the first release member abuts the second release member.

7. A release sleeve according to claim 1, wherein the second release member includes a split completely therethrough to allow the second release member to expand during assembly onto the first coupling member.

8. A release sleeve according to claim 1, wherein a distal end of the bulbous portion includes at least one bead.

9. A release sleeve according to claim 1, wherein the flexible sealing portion further includes a fin portion that sealingly engages the first coupling member.

10. A release sleeve according to claim 9, wherein an inside diameter of the fin portion includes at least one bead.

11. A release sleeve according to claim 1, wherein the flexible sealing portion comprises a polymeric material.

12. A release sleeve according to claim 1, wherein a chemical compound is used to promote chemical adhesion of the flexible sealing portion to the rigid release portion.

13. A coupling assembly comprising:
    a first coupling member;
    a second coupling member including a portion for receiving the first coupling member, the second coupling member comprising one of an integral coupling member formed in an apparatus and an independent coupling member created separate from an apparatus to which it is connected, the integral coupling member including a first mating surface and the independent coupling member including a second mating surface; and
    a release sleeve moveably mounted on the first coupling member, the release sleeve including a rigid release portion and a flexible sealing portion, the rigid release portion comprising a first release member and a separate second release member, the flexible sealing portion including a bulbous portion capable of sealingly engaging the first mating surface on the integral coupling member and the second mating surface on the independent coupling member to substantially inhibit the entry of contamination into the receiving portion of the second coupling member.

14. The coupling assembly of claim 13, wherein first mating surface on the integral coupling member comprises a recess.

15. The coupling assembly of claim 14, wherein the bulbous portion sealingly engages the recess in an axial direction.

16. The coupling assembly of claim 14, wherein the bulbous portion sealingly engages the recess in an axial and radial direction.

17. The coupling assembly of claim 13, wherein second mating surface on the independent coupling member comprises an exterior cylindrical surface.

18. The coupling assembly of claim 17, wherein the bulbous portion sealingly engages the cylindrical surface in a radial direction.

19. A coupling assembly comprising:
    a first coupling member;
    a second coupling member including a portion for receiving the first coupling member and an annular sealing member proximate a receiving end of the second coupling member, the sealing member including a rigid retaining portion and a flexible sealing portion; and
    wherein when the first coupling member is connected to the second coupling member, the the flexible sealing portion sealingly engages the first coupling member to substantially inhibit the entry of contamination into the receiving portion of the second coupling member.

20. The coupling assembly of claim 19, wherein an apparatus is provided for mating with the first coupling member, the second coupling member being integrally formed in the apparatus.

21. The coupling assembly of claim 19 further including a release sleeve moveably mounted on the first coupling member to release the first coupling member from the second coupling member.

22. The coupling assembly of claim 21, wherein the release sleeve includes a cylindrical wall portion extending from a leading edge to an outwardly extending wall portion, the outwardly extending wall portion terminating into a flat having a flange portion, the flange portion having a radially outer terminal edge.

23. The coupling assembly of claim 19, wherein the sealing portion comprises a polymeric material having an elastomeric and/or thermoplastic base polymer.

24. The coupling assembly of claim 19, wherein the sealing portion includes an external surface and an internal surface having a notch that allows sealing portion to collapse on itself.

25. The coupling assembly of claim 19 further including a chamfer relief area adjacent the sealing member to provide room for the sealing portion to deform during connection of the first coupling member with the second coupling member.

26. A coupling assembly comprising:
   a first coupling member;
   a second coupling member including a portion for receiving the first coupling member and an annular sealing member proximate a receiving end of the second coupling member, the sealing member including a rigid retaining portion and a flexible sealing portion;
   a release sleeve moveably mounted on the first coupling member to release the first coupling member from the second coupling member, the release sleeve including a cylindrical wall portion extending from a leading edge to an outwardly extending wall portion, the outwardly extending wall portion terminating into a flat having a flange portion, the flange portion having a radially outer terminal edge, the release sleeve further including a seal that sealingly engages the first coupling member; and
   wherein when the first coupling member is connected to the second coupling member, the sealing member sealingly engages one of the first coupling member and release sleeve to substantially inhibit the entry of contamination into the receiving portion of the second coupling member.

27. A coupling assembly comprising:
   a first coupling member;
   a second coupling member including a portion for receiving the first coupling member and an annular sealing member proximate a receiving end of the second coupling member, the sealing member including a rigid retaining portion and a flexible sealing portion, the retaining portion received in a groove in the second coupling member; and
   wherein, when the first coupling member is connected to the second coupling member, the sealing member sealingly engages the first coupling member to substantially inhibit the entry of contamination into the receiving portion of the second coupling member.

28. The coupling assembly of claim 27 wherein the retaining portion is pressed-fit into the groove in the second coupling member.

* * * * *